Sept. 3, 1963 R. B. DOME 3,102,925

VIDEO FREQUENCY AMPLIFIERS FOR TELEVISION RECEIVERS

Filed Dec. 16, 1960

INVENTOR:
ROBERT B. DOME,
BY Joseph Levinson
HIS ATTORNEY.

United States Patent Office 3,102,925

Patented Sept. 3, 1963

3,102,925

VIDEO FREQUENCY AMPLIFIERS FOR TELEVISION RECEIVERS

Robert B. Dome, Geddes Township, Onondaga County, N.Y., assignor to General Electric Company, a corporation of New York Filed Dec. 16, 1960, Ser. No. 76,369
5 Claims. (Cl. 178—7.5)

The present invention relates to television receivers and more particularly, to improvements in the video frequency amplifier of a television receiver whereby improved operation of the synchronizing separator and automatic gain control circuits is achieved while at the same time incorporating an effective means for manual contrast control.

It is desirable to design television receivers of substantial reliability and yet maintain the cost and number of required electrical components at a minimum. This requirement generally has limited the number of stages of video frequency amplification in television receivers to a maximum of two stages. Furthermore, in order to obtain economy, it has been customary to make the amplifier perform more than its principal function of supplying the picture tube with an adequate video frequency voltage. In addition to this function the amplifier also serves to supply amplified video frequency voltages to the synchronizing separator circuit and to provide amplification of intercarrier intermediate frequency signals used in the audio or sound portion of the receiver for deriving audio frequency signals for operating the loudspeaker. It has also been customary in television receivers to supply a means for manually controlling the output level of the video frequency signals coupled to the picture tube so as to enable the user to vary the contrast of the picture to suit personal tastes and to compensate for ambient lighting and for input signal variations that may occur.

Some specific problems arise in meeting these multifunction requirements simultaneously. The problems arise principally because of the requirement for a manual contrast control. It is undesirable to derive input signals for the synchronizing signal separator and the sound channel circuits from a point in the circuit where the video signal level is subject to amplitude control inasmuch as signals of widely different levels resulting from variations in the contrast control are not as satisfactory for sound and for synchronizing signal separation as signals that are uniform in level. When the signal level is subject to wide variations, the sound channel can show noise and audio output level variations while the separator may have insufficient level at times to provide for clean separation of the synchronizing signal pulses from the video picture information. Also, in systems wherein the automatic gain control for the radio frequency and intermediate frequency amplifiers of the receiver is at least partially derived from a bias developed at the separator circuit, the automatic gain control performance of the receiver is largely defeated.

One solution to these problems has been to provide for contrast control by varying the cathode resistor in the second video frequency amplifier stage. A video input signal for the picture tube is derived from the output of the second stage while the separator and sound channels are derived from the output of the first stage. A difficulty with this arrangement is that the signal level at the first stage is considerably lower than desirable for input to the separator circuits.

It is therefore an object of the present invention to provide a two-stage video amplifier circuit arrangement whereby the voltage level of the signal to be connected to the synchronizing signal separator circuit, the automatic gain control circuit, and the audio circuit is much greater in amplitude than the voltage level obtainable from a conventional video amplifier arrangement while, at the same time, provision is made for contrast control in the second stage of the amplifier.

It is also an object of this invention to provide an amplifier in which one stage exhibits a pronounced rise in gain at the lower end of its gain versus frequency response characteristic while the amplifier as a whole maintains an essentially uniform gain versus frequency response characteristic.

It is also an object of this invention to provide an improved video amplifier circuit having provision for an improved synchronization signal source for use in a television receiver circuit.

It is a further object of this invention to provide an improved video amplifier circuit having provision for an improved automatic gain control circuit for use in a television receiver circuit.

In accordance with the present invention, a direct coupled video amplifier is provided having two cascaded stages of amplification for amplifying a composite video signal comprising audio, video, and synchronizing signal information. An impedance in the interstage coupling circuit together with impedance means in the second stage are arranged so that at the lower video signal frequencies, the load impedance for the first stage rises in value resulting in a pronounced rise in lower video frequency signal gain for the first stage while the gain for the over-all amplifier remains essentially uniform for all video signal frequencies. Since the synchronizing signals and automatic gain control signals consist primarily of relatively low frequency components, operation of their respective utilization circuits from signals at the output of the first amplifier stage is enhanced by the increased voltage levels for signals of such frequencies. With such an arrangement, the contrast control operation in the second video amplifier stage will have little or no deleterious effects on the aforementioned synchronization and automatic gain control circuits and t he output of the over-all video amplifier may be controllably applied to a first utilization circuit including the cathode ray tube.

Further objects, features and the attending advantages of the invention will be apparent with reference to the following specifications and drawings in which.

Figure 1:
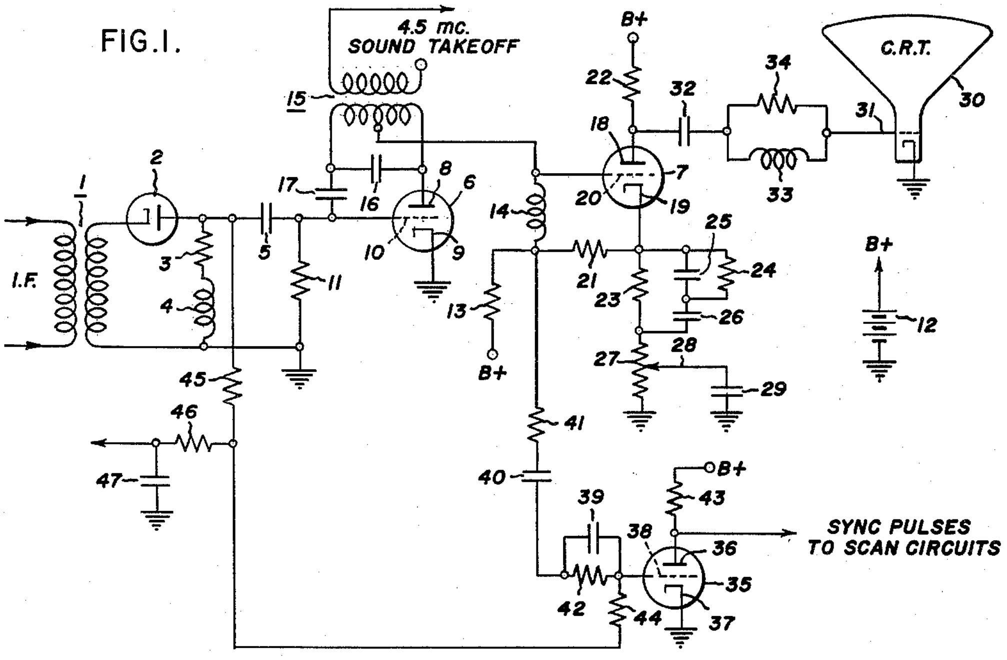
FIGURE 1 is a circuit diagram showing the video amplifier and an associated first utilization circuit including an image reproducing tube and additional utilization circuits including a synchronizing separator circuit, automatic gain control voltage source circuit and audio detector and amplifier voltage source circuit.

Referring now to FIGURE 1, a video detection stage is shown including an IF transformer 1 for coupling a composite video signal having video, audio and synchronizing information components from prior IF amplifiers, not shown, to a video detector circuit. The video detector circuit comprises a diode 2 and a load resistor 3 connected in series with a peaking coil 4. A capacitor 5 couples the detected composite video signal to a video amplifier. The video amplifier is comprised of electron discharge devices 6 and 7. Electron discharge device 6 includes an anode 8, cathode 9, and a control electrode 10. Resistor 11 provides a bias potential for control electrode 10. Cathode 9 and one end of resistor 11 are connected to ground potential. Anode-electrode voltage is provided by any suitable power supply. FIGURE 1 illustrates a battery 12 as the anode power supply having its negative terminal connected to ground potential. This voltage is applied to anode 8 via load resistor 13, peaking coil 14 and through a tapped connection on the primary winding of transformer 15.

The primary winding of transformer 15 is tuned by a capacitor 16 to an intercarrier sound frequency of 4.5 megacycles. The secondary of transformer 15 couples this intercarrier sound frequency signal to an audio detector and amplifier utilization circuit, not shown. Capacitor 17, connected to the primary of transformer 15 and control electrode 10, provides some feedback to the input circuit of electron discharge device 6 for neutralization purposes at 4.5 megacycles.

Electron discharge device 7 has an anode 18, a cathode 19, and a control electrode 20. Control electrode 20 is direct-coupled to anode 8 through the primary winding of transformer 15. Resistor 21 couples the anode 8 of electron discharge device 6 to the cathode 19 of electron discharge device 7 via peaking coil 14. An additional path for anode-electrode voltage for electron discharge device 6 may be traced from the cathode-anode path of electron discharge device 7 through resistor 21, inductor 14, and the primary winding of transformer 15 to anode 8. Anode voltage is supplied to the electron discharge device 7 via load resistor 22.

In accordance with this invention, a frequency compensation network is located in the cathode to ground circuit of electron discharge device 7. This compensation circuit comprises resistors 23 and 24 and capacitors 25 and 26. One end of resistor 23 is connected to cathode 19 and its opposite end is connected to a manual video frequency gain or contrast control potentiometer 27. Capacitors 25 and 26 are connected in series and this series connected circuit comprising capacitors 25 and 26 is connected in parallel with resistor 23. Resistor 24 is connected in parallel with capacitor 25. One end of potentiometer 27 is connected to ground potential. The arm 28 of this potentiometer is connected to ground potential for the video signal frequencies through a suitably large by-pass capacitor 29. The output circuit of electron discharge device 7 consists of a plate load resistor 22. A first utilization circuit including the image producing tube 30 derives a control signal which is applied to its control electrode 31 from anode-electrode 18 of electron discharge device 7 through the coupling capacitor 32 and peaking inductor 33. The inductor 33, is shunted by a suitable damping resistor 34.

Additional utilization circuits of a conventional television receiver circuit may include sync-separator, automatic gain control and audio detector and amplifier circuits. An electron discharge device 35 having an anode 36, cathode 37, and control electrode 38 is employed in a synchronizing signal separator circuit. The control electrode 38 of electron discharge device 35 is connected to the junction of inductor 14, resistor 21 and resistor 13 through capacitor 39, capacitor 40, and resistor 41. Capacitor 39 is shunted by a resistor 42. Anode 36 is connected to the anode power supply through plate load resistor 43.

Resistor 44 and resistor 45 provide an automatic gain control voltage for the automatic gain control utilization circuit of the receiver. One end of an automatic gain control filter resistor 46 is connected to the junction of resistor 44 and resistor 45. A filter capacitor 47 is connected between the opposite end of resistor 46 and ground. The junction of resistor 46 and capacitor 47 is connected to control electrode circuits of preceding IF, RF, and converter stages to control the gains thereof as is well known.

Considering briefly the operation of the circuit as a whole and neglecting, for a moment, the specific operation of the video amplifier, a composite video signal including video, audio, and synchronizing information is coupled from a prior IF amplifier, not shown, to the video detector diode 2 via coupling transformer 1. After detection, the modulation components are applied to the first stage of the video frequency amplifier for amplification. Upon amplification by electron discharge device 6, the audio information is then applied to an audio utilization circuit and the video and synchronizing information is applied to both the second stage of the amplifier for use in a first utilization circuit and to additional utilization circuits. The first utilization circuit includes an image reproducing tube 30. The video component when applied to the control electrode of the image reproducing tube 30 modulates the intensity of the electron beam in accordance with the video frequency components. The additional utilization circuits include the sync-separator and automatic gain control circuits. The synchronizing signal components of the signal are separated from the video frequency components in the synchronizing separator stage and are used to synchronize the operation of sweep circuits in the television receiver. An intercarrier IF audio signal is derived from the plate of the first video amplifier and is applied to audio detecting and translating equipment, not shown, wherein it is amplified, detected and the sound is reproduced by a sound reproducing device.

Referring now more particularly to the video amplifier of this invention, this amplifier is a two-stage D.C. coupled amplifier having an adjustably by-passed cathode resistor 27 for manual gain control purposes. The invention includes a complex impedance in the cathode of discharge device 7 with resistors 23, 24 and capacitors 25 and 26 arranged and selected to provide over-all uniform frequency response for the amplifier. This impedance in the cathode circuit serves a very useful purpose of unloading the anode-electrode of the preceding electron discharge device 6 through the circuit including the resistor 21 so that the gain of this stage automatically rises at low frequencies and provides a relatively high output from anode 8 to ground at these frequencies. This high level, low frequency signal is utilized by the additional utilization circuits such as the separator clipper to provide adequate signal level in order to perform its function reliably. The amplitude of this high level signal results from an increase in the load impedance in the anode circuit of electron discharge device 6. This increase in load impedance results from the fact that the resistor 21 has a higher apparent resistance than indicated by its actual value due to its connection between the anode 8 of electron discharge device 6 and cathode 19 of electron discharge device 7.

The output resistance, $R_0$, presented to the first electron discharge device 6 by resistor 21 can be shown to be approximately:

$$R_0 = R_{21}\left[1 + \frac{\mu}{\frac{r_p + R_{22}}{Z_k} + 1}\right]$$

where $R_0$ is the output resistance in ohms, $R_{21}$ is the resistance in ohms of resistor 21, $R_{22}$ is the resistance in ohms of resistor 22, $Z_k$ is the impedance in ohms between the cathode 19 of electron discharge device 7 and ground, $r_p$ is the plate resistance in ohms of electron discharge device 7 and $\mu$ is the non-dimensional amplification factor of electron discharge device 7.

The term in parentheses in the equation for the output resistance $R_0$ indicates that resistor 21 is increased in value by a factor proportional to the impedance of $Z_k$ in the cathode circuit of electron discharge device 7. As $Z_k$ increases, $R_0$ increases. In the illustrated circuit of FIGURE 1, $Z_k$ increases in value at the lower frequencies. Thus, $R_0$ has a distinguishable rise in impedance at the lower frequencies. This results in a greatly increased low end frequency response for the amplifier.

Figure 2:
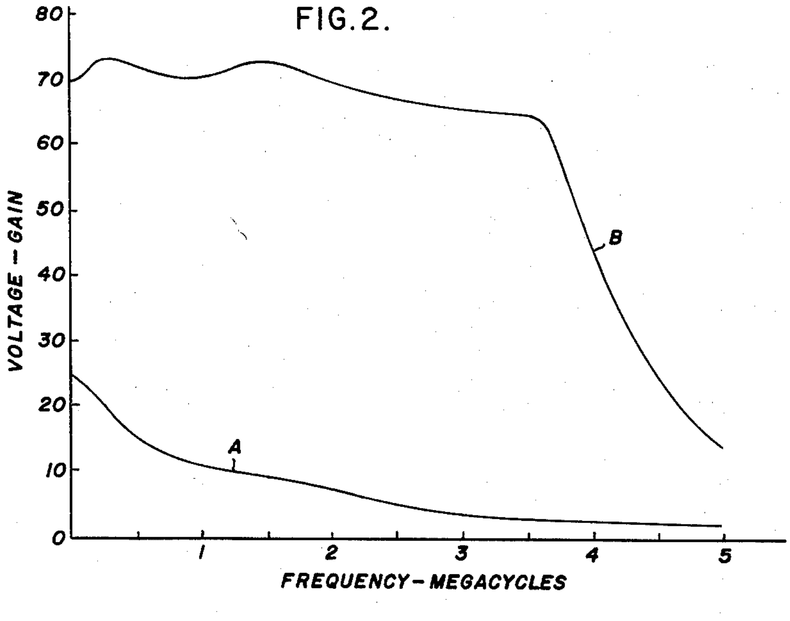
FIGURE 2 illustrates curves of the gain versus frequency characteristics of the first stage of the amplifier and the over-all response curve of the amplifier.

A typical response characteristic for the first stage is shown by curve A of FIGURE 2. Reference to curve A of FIGURE 2 illustrates a pronounced rise in gain for the first video amplifier stage including electron discharge device 6 and represents the response characteristics of the stage when the output of the stage is measured at the control electrode 38 of electron discharge device 35. There is a pronounced rise in the gain of the stage at a frequency of one megacycle and frequencies below one megacycle. Curve B is a response curve of the over-all amplifier and illustrates that the over-all amplifier gain is essentially uniform up to 3½ megacycles.

In accordance with a feature of this invention, the impedance $Z_k$ increases in value with decreasing frequency. This increase in $Z_k$ serves to increase $R_0$ as has already been described. Additionally, this increase in $Z_k$ increases the amount of degenerative feedback in the cathode circuit of electron discharge device 7 at the lower frequencies. The rise in low frequency gain obtained at the output of the first stage would ordinarily be reflected in the over-all amplifier response characteristic and would show a rise in low frequency gain. But, any increase in low frequency gain at the output of this second stage is counteracted by the aforementioned degeneration resulting in an over-all uniform gain frequency characteristic for the video amplifier.

As the RF input signal to the television receiver increases in amplitude, the direct current component of the detector 2 and the D.C. component of the signal at the control electrode 38 of the sync-separator clipper circuit increases to provide automatic back bias. The combination of resistor 44 and resistor 45 provides large values of automatic gain control bias voltage due to the increased low frequency gain of electron discharge device 6 and also provides for maximum amplification when the receiver signal is a low level signal.

Because the manual contrast control potentiometer 27 is located in the cathode circuit of electron discharge device 7 and because a high level signal is available at anode 8 of electron discharge device 7, the additional utilization circuits such as the synchronizing separator circuit have a high level input signal at the lower frequencies insuring stable operation of the associated sweep circuits notwithstanding the variable operation of the contrast control potentiometer 27. Also, the increased clipper input signal contributes more D.C. voltage by rectification and, hence, further A.G.C. voltage to the automatic gain control utilization circuits.

While I have illustrated and described and have pointed out in the annexed claims certain novel features of my invention, it will be understood that various omissions, substitutions and changes in the forms and details of the system illustrated may be made by those skilled in the art without departing from the spirit of the invention and the scope of the claims.

What is claimed as new and desired to be secured by Letters Patent of the United States is:

1. In a television receiver having a first utilization circuit including a cathode ray tube and additional utilization circuits including sync-separator and automatic gain control circuits, a video signal amplifier comprising: first and second cascade coupled video signal amplifying stages; each of said stages including an amplifying device having input and output electrodes; means providing and coupling a composite video signal to be amplified to said input electrode of said first stage; means coupling an amplified video signal from said output electrode of said second stage to the first utilization circuit; circuit means for coupling the signal being amplified from said output electrode of said first stage to said input electrode of said second stage and to at least one of the additional utilization circuits; and frequency responsive circuit means coupled to an electrode of said amplifying device in said first and second stages; means for simultaneously increasing the gain of said first stage and for decreasing the gain of the second stage at the lower video signal frequencies relative to the gain of said stages at the higher video signal frequencies.

2. In a television receiver having a first utilization circuit including a cathode ray tube and additional utilization circuits including sync-separator and automatic gain control circuits, a video signal amplifier comprising: first and second video signal amplifying stages; each of said stages including an electron discharge amplifying device having anode, cathode and control electrodes; means providing and coupling a composite video signal which is to be amplified to said first stage; means coupling the video signal being amplified from the anode electrode of said amplifying device in said first stage to the control electrode of the amplifying device in said second stage and to at least one of the additional utilization circuits; means coupling an amplified video signal from said anode electrode of said amplifying device in said second stage to the first utilization circuit; and means comprising an impedance intercoupling the anode of said amplifying device of said first stage and the cathode of the amplifying device of said second stage, and a frequency dependent impedance coupled in the cathode-anode circuit of the electron discharge device of said second stage for simultaneously increasing the gain of said first stage and for decreasing the gain of said second stage at the lower video signal frequencies relative to the gain of said stage at the higher video signal frequencies.

3. In a television receiver having a first utilization circuit including a cathode ray tube and additional utilization circuits including sync-separator and automatic gain control circuits, a video signal amplifier comprising: first and second video signal amplifying stages; each of said stages including an electron discharge amplifying device having anode, cathode and control electrodes; means providing and coupling a composite video signal which is to be amplified to said control electrode of said amplifying device of said first stage; means coupling the video signal being amplified from the anode electrode of said amplifying device of said first stage to the control electrode of said amplifying device in second stage and to at least one of the additional utilization circuits; means coupling an amplified video signal from said anode electrode of said amplifying device in said second stage to the first utilization circuit; a first impedance intercoupling the anode electrode of said amplifying device in said first stage to said cathode electrode of said amplifying device in said second stage; and an impedance network coupled between the anode and cathode electrode of said amplifying device in said second stage, said impedance network including first and second parallel connected branches, said first branch comprising a resistor, said second branch comprising first and second serially connected capacitors, said first capacitor having one end connected to said cathode of said amplifying device in said second stage, and a resistor connected in parallel with said first capacitor.

4. In a television receiver having a first utilization circuit including a cathode ray tube and additional utilization circuits including sync-separator and automatic gain control circuits, a video signal amplifier comprising: first and second cascade coupled video signal amplifying stages; each of said stages including an amplifying device having input and output electrodes; said amplifying device of said first stage having a load impedance; said amplifying device of said second stage having an impedance coupled to an electrode thereof for providing degeneration in said second stage; means providing and coupling a composite video signal to be amplified to said input electrode in said first stage; means coupling an amplified video signal from said output electrode in said second stage to the first utilization circuit; means coupling the signal being amplified from said output electrode in said first stage to said input electrode in said second stage and to at least one of the additional utilization circuits; and means for simultaneously increasing the gain of said first stage and for decreasing the gain of the second stage at the lower video signal frequencies relative to the gain of said stages at the higher video signal frequencies, said latter means comprising frequency responsive circuit means coupled to electrodes of said amplifying devices in said first and second stages for simultaneously increasing the value of the load impedance of said first stage and for increasing the value of the degeneration impedance of said second stage at the lower frequencies relative to their values at the higher video frequencies.

5. In a television receiver having a first utilization circuit including a cathode-ray tube and additional utilization circuits including sync-separator and automatic gain control circuits, a video signal amplifier comprising: first and second video signal amplifying stages; each of said stages including an electron discharge amplifying device having anode, cathode, and control electrodes; means providing and coupling a composite video signal which is to be amplified to said first stage; means coupling the video signal being amplified from the anode electrode of said amplifying device in said first stage to the control electrode of the amplifying device in said second stage and to at least one of the additional utilization circuits; means coupling an amplified video signal from said anode electrode of said amplifying device in said second stage to the first utilization circuit; and means for increasing the gain of said first stage and for decreasing the gain of said second stage at the lower video signal frequencies relative to the gain of said stages at the higher video signal frequencies, said latter means comprising an impedance intercoupling the anode of said amplifying device of said first stage and the cathode of the amplifying device of said second stage and a frequency dependent impedance coupled in the cathode-anode circuit of the electron discharge device of said second stage, said frequency dependent impedance having an impedance which increases at the lower video frequencies relative to its value at higher video frequencies.

References Cited in the file of this patent

UNITED STATES PATENTS

| | | |
|---|---|---|
| 2,505,367 | Shaw | Apr. 25, 1950 |
| 2,797,258 | Denton | June 25, 1957 |
| 2,832,822 | Rogers | Apr. 29, 1958 |
| 2,913,521 | Thomas | Nov. 17, 1959 |
| 2,921,130 | Jones | Jan. 12, 1960 |
| 2,921,131 | Bonner | Jan. 12, 1960 |

OTHER REFERENCES

RCA Service Data Chassis No. CTC7P, Dec. 18, 1957, pages 11–13.